United States Patent [19]
Zosel

[11] 3,806,619
[45] Apr. 23, 1974

[54] PROCESS FOR RECOVERING CAFFEINE

[75] Inventor: Kurt Zosel, Oberhausen/Rheinland, Germany

[73] Assignee: Studiengesellschaft Kohle m.b.H, Mulheim/Ruhr, Germany

[22] Filed: May 3, 1972

[21] Appl. No.: 249,809

[30] Foreign Application Priority Data
May 7, 1971 Austria................................ 4003/71

[52] U.S. Cl.............. 426/478, 426/427, 159/16 R, 159/47, 203/49
[51] Int. Cl. ............................................. A23f 1/10
[58] Field of Search ......... 99/69, 70; 159/16 R, 47; 203/12, 24, 26, 49

[56] References Cited
UNITED STATES PATENTS

| | | | |
|---|---|---|---|
| 1,640,648 | 8/1927 | Cross | 99/69 |
| 2,032,087 | 2/1936 | Göth | 159/16 R |
| 2,042,488 | 6/1936 | Theiler | 159/16 R X |
| 2,342,419 | 2/1944 | Martin | 159/16 R X |
| 2,619,453 | 11/1952 | Andersen | 203/12 X |
| 3,345,272 | 10/1967 | Collins | 159/16 R |

FOREIGN PATENTS OR APPLICATIONS
1,057,911  2/1967  Great Britain

Primary Examiner—Frank W. Lutter
Assistant Examiner—William L. Mentlik
Attorney, Agent, or Firm—Ralph D. Dinklage

[57] ABSTRACT

A process for obtaining caffein from green coffee by withdrawing the caffein by means of recirculating moist carbon dioxide in supercritical state, which comprises removing the caffein from the caffein-loaded carbon dioxide by repeated treatment with water and recovering the caffein and the water from the resultant dilute aqueous caffein solution by recycling a stream of air or nitrogen under a superatmospheric pressure at about 1 to 5 atmospheres through the heated caffein solution and a heat exchanger, separating the caffein and the condensed water and recycling after admixture of cold caffein solution the gas through the heat exchanger in countercurrent flow relation and meeting the heat requirement by supplying heat to the hot caffein solution.

6 Claims, 1 Drawing Figure

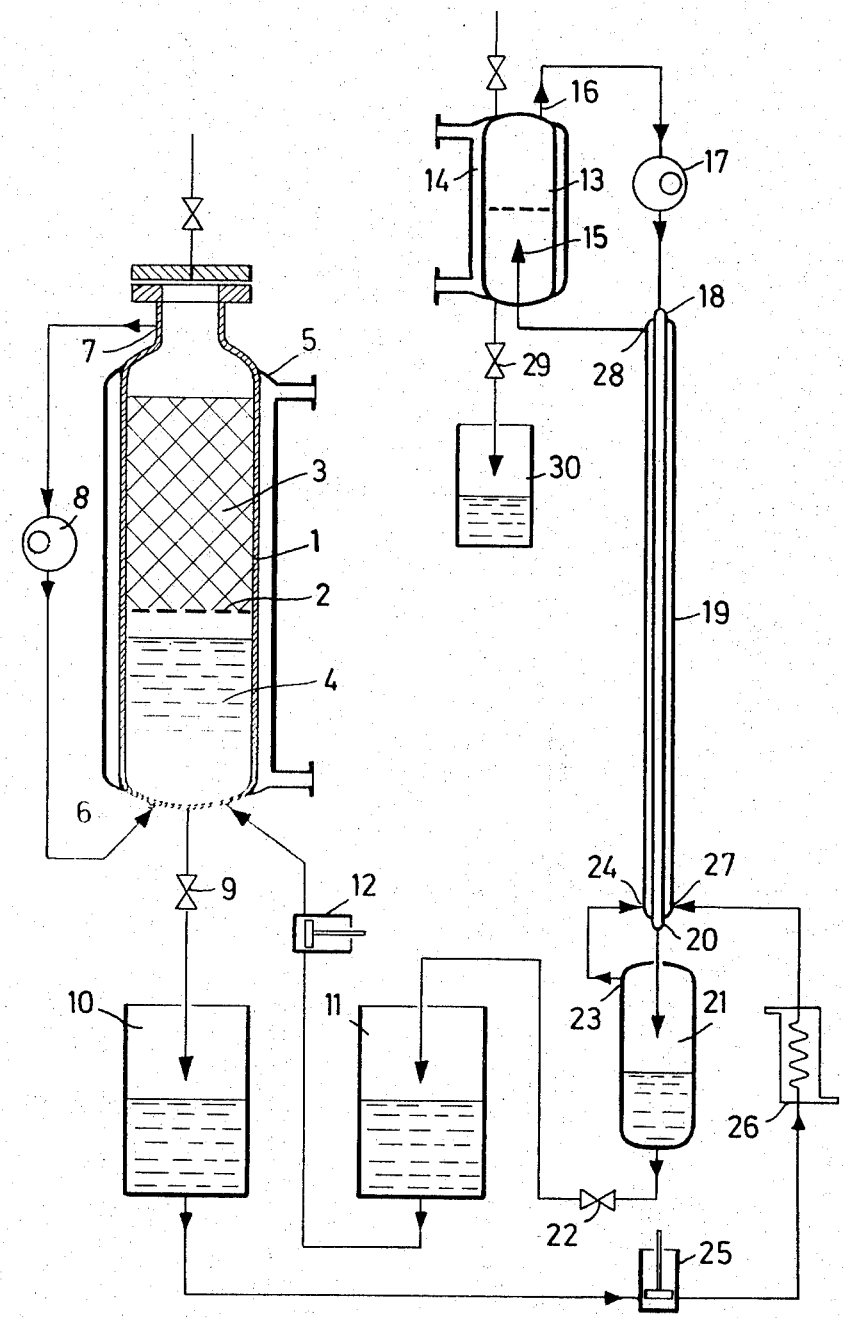

PROCESS FOR RECOVERING CAFFEINE

This invention relates to a process for obtaining caffein from green coffee.

Austrian Pat. No. 290,962 and U.S. application Ser. No. 364,190, filed May 25, 1973 disclose a process for decaffeinating green coffee, wherein moist carbon dioxide is recycled through a bed of green coffee and a bed of activated charcoal. The moist carbon dioxide passes through the green coffee bed in supercritical state and through the bed of activated charcoal at a lower temperature in liquefied state. The moist carbon dioxide in supercritical state is loaded thereby with the caffein of the green coffee and the caffein is adsorbed on the activated charcoal.

The recovery of the caffein from the activated charcoal is not described in the patent mentioned above.

This recovery is desirably effected in a separate process step by treating the caffein-saturated activated charcoal with steam of about 250°C. Relatively large amounts of steam are necessary to largely recover the caffein. Thus, the caffein is obtained in a very dilute aqueous solution.

Recovery of the caffein from the activated charcoal by means of an organic solvent is undesirable because residues of the solvent remain on the activated charcoal and reuse of this activated charcoal will detrimentally influence the flavor and aroma characteristics of the coffee.

It has now been found that, on the one hand, the use of activated charcoal as the adsorbent can be replaced by water as a solvent and, on the other hand, the caffein can be recovered from the dilute aqueous solution in a very economical manner.

It is an object of the invention to provide a process for recovering caffein from green coffee by withdrawing the caffein by means of recirculating moist carbon dioxide in supercritical state, which comprises removing the caffein from the caffein-loaded carbon dioxide by repeated treatment with water and recovering the caffein and the water from the resultant dilute aqueous caffein solution by recycling a stream of air or nitrogen under a superatmospheric pressure of about 1 to 5 atmospheres through the heated caffein solution and a heat exchanger, separating the caffein and the condensed water and recycling the gas stream after admixture of cold caffein solution through the heat exchanger in countercurrent flow relation and meeting the heat requirement by supplying heat to the hot caffein solution.

Accordingly, the invention provides a process for obtaining caffein from green coffee, which comprises contacting moist carbon dioxide in supercritical state with the coffee in a caffein absorption zone for absorption of caffein by the moist carbon dioxide. Moist carbon dioxide containing absorbed caffein is withdrawn from the absorption zone and is contacted with water for extraction of caffein from the moist carbon dioxide in an extraction zone for formation of an aqueous solution of caffein. The moist carbon dioxide is recirculated between the absorption zone and the extraction zone. Aqueous solution of caffein is withdrawn from the extraction zone and introduced into an evaporation zone. A stream of air or nitrogen is passed through the aqueous solution in the evaporating zone for evaporation of water from the solution and concentration of the caffein in the aqueous solution, and concentrated aqueous solution of caffein is withdrawn from the evaporation zone. The air or nitrogen laden with water vapor is withdrawn from the evaporating zone and cooled for condensation of water, and the air or nitrogen is separated from the condensed water in a separating zone. The air or nitrogen is recirculated between the evaporating zone and the separating zone. Aqueous solution of caffein from the extraction zone is admixed with the air or nitrogen conveyed from the separating zone to the evaporating zone. The air or nitrogen laden with water vapor and the said admixture are passed in indirect heat exchange relation in a heat exchanger wherein the flow may be countercurrent, between the evaporating zone and the separating zone, for cooling of the air or nitrogen laden with water vapor for said condensation of water and heating said admixture for heating the aqueous solution for the evaporation. Additional heat is supplied to the aqueous solution for the evaporation.

The process according to the invention is illustrated by the following example:

In the pressure vessel 1, green coffee 3 is supported by a perforated tray 2 and water 4 is contained in the lower part. The pressure vessel is heated to about 70°C by means of a water jacket 5. Carbon dioxide entering at 6 is passed through the pressure vessel at a temperature of about 70°C and a pressure of about 160 atm. Initially the carbon dioxide bubbles through the water and, in doing so, becomes loaded with water and then passes through the coffee while initially delivering part of its water to the coffee beans and simultaneously becoming loaded with caffein. The carbon dioxide which is now loaded with both water and caffein leaves the pressure vessel 1 at 7 and is then returned into the pressure vessel 1 at 6 by means of a grear pump or centrifugal pump 8. Thus, the carbon dioxide is recycled at a substantially constant temperature and a constant pressure.

The amount of coffee 3 and the amount of water 4 in the pressure vessel 1 should have approximately the same weight. After a treatment of about 4 hours, the green coffee has only about half of its original content of caffein. The separated caffein is now contained in the water 4 in dissolved form. From now on, the further separation of caffein from the green coffee proceeds only at a slow rate and ultimately ceases.

Therefore, after about 4 hours of treatment, the water 4 is largely drained from the pressure vessel 1 through the drain valve 9 into the stock reservoir 10 and thereafter the same amount of pure water from the reservoir 11 is pumped into the pressure vessel 1 by means of the pump 12.

After a further treatment for about four hours, the caffein content of the green coffee has again dropped by one half. Replacement of the water 4 in the pressure vessel 1 by pure water is repeated about four times.

After a treatment time of about 20 hours, the residual content of caffein in the green coffee has decreased to less than 0.08 percent by weight, i.e., the upper limit for decaffeinated coffee according to official regulations.

The total caffein having been removed from the green coffee is now contained in an aqueous solution in the reservoir 10. A small portion of this solution is initially heated in the vessel 13 to about 100°C by the external heating jacket 14. Air or nitrogen under a pressure of about 4 atm. is blown through the solution at 15. The air becomes loaded with vapour, leaves vessel 13 at 16 and passes through the gas recirculation pump 17 and into heat exchanger 19 at 18. After having been cooled, the air leaves heat exchanger 19 at 20 and passes into vessel 21 where condensed water and air are separated. The water is returned through valve 22 into the reservoir 11. The air leaves the vessel 21 at 23 and is introduced into the lower end of the heat exchanger 19 at 24.

At the same time, caffein solution from the reservoir 10 is continuously pumped also into the lower end of the heat exchanger 19 at 27 by means of pump 25 through cooler 26.

In the heat exchanger 19, the cold air and the cold solution which are intimately mixed jointly flow in countercurrent towards the hot air coming from vessel 13 and being saturated with vapour. Thereby, the air and the solution are heated and the air is simultaneously saturated with vapour. The air which is now again hot and saturated with vapour and hot concentrated caffein solution leave the heat exchanger 19 again at 28 and pass into the vessel 13 at 15.

After a starting period of about 1 hour, the vessel 13 contains an almost concentrated hot solution of caffein in water and hot air saturated with water vapor. The saturated solution is continuously withdrawn through valve 29 into a receiver 30. Upon cooling of the hot saturated caffein solution to room temperature, the bulk of the dissolved caffein is precipitated in crystalline form. The mother liquor is returned into the reservoir 10.

The heat exchanger 19 of the pilot unit consisted of two copper tubes of about 5 meters in length and 3 and 7 cm respectively, in internal diameter fitted concentrically into one another and filled with copper helixes (filling bodies).

The hot air saturated with water vapor and entering the heat exchanger at the top at 18, on the one hand, and the cold air or cold solution, on the other hand, entering the heat exchanger at the base at 24 and 27, respectively, exchange their sensible heat while flowing in countercurrent flow relation. However, additionally and at the same time, the heat of condensation (latent heat) which is formed is continuously utilized throughout the heat exchanger directly as heat of evaporation to saturate the air of the warming mixture of air and solution with water vapor.

The process described above for recovering caffein from the dilute aqueous solution or the separation of the solvent has the advantage over simple evaporation that the process according to the invention requires only about one tenth of evaporation energy. This evaporation energy which is still required is supplied to the separation unit via the outer heating jacket 14.

This considerably economy of energy appears to be important when considering that, with a daily production of 20 tons of decaffeinated coffee, about 100 cu.m. of aqueous caffein solution having an average concentration of about 0.2 percent are obtained per day. In the process according to the invention, the caffein is obtained directly with a degree of purity of about 95 percent and more depending upon the region where the coffee is grown. Thus, while the green coffee is decaffeinated, other accompanying substances although to a substantially lower extent, are simultaneously separated from the green coffee, which has a beneficial effect on the wholesomeness of the coffee. These accompanying substances comprise minor products not belonging to the classes of proteins or carbohydrates.

What is claimed is:

1. A process for obtaining caffein from green coffee which comprises:

a. contacting moist carbon dioxide in supercritical state with the coffee in a caffein absorption zone for absorption of caffein by the moist carbon dioxide, b. withdrawing the moist carbon dioxide containing absorbed caffein from the absorption zone and contacting it with water for extraction of caffein from the moist carbon dioxide in an extraction zone for formation of an aqueous solution of caffein, c. recirculating the moist carbon dioxide between the absorption zone and the contacting zone, d. withdrawing aqueous solution of carbon dioxide from the extracting zone and introducing it into an evaporating zone, passing a stream of air or nitrogen through the aqueous solution in the evaporating zone for evaporation of water from the solution and concentration of caffein in the aqueous solution, and withdrawing a concentrated aqueous solution from the evaporating zone, e. withdrawing the air or nitrogen laden with water vapor from the evaporating zone and cooling it for condensation of water and separating the water from the air or nitrogen in a separating zone, f. recirculating the air or nitrogen between the evaporating zone and the separating zone, g. admixing aqueous solution of carbon dioxide from the extraction zone with the air or nitrogen conveyed from the separating zone to the evaporating zone, h. passing the air or nitrogen laden with water vapor and the admixture formed in step (g) in indirect heat exchange relation between the evaporating zone and the separating zone, for cooling of the air or nitrogen laden with water vapor for the condensation of step (e) and heating said admixture for heating the aqueous solution for the evaporation, and j. supplying additional heat to the aqueous solution for the evaporation.

2. A process according to claim 1, wherein, in the heat exchange of step (h), the flow is countercurrent.

3. A process according to claim 1, wherein the pressure in the evaporating zone is about 1 to 5 atmospheres.

4. A process for concentrating a dilute aqueous solution of caffein, which comprises:

a. introducing the dilute aqueous solution into an evaporating zone, passing a stream of air or nitrogen through the aqueous solution in the evaporating zone for evaporating of water from the aqueous solution and concentration of caffein in the aqueous solution, and withdrawing a concentrated aqueous solution from the evaporating zone, b. withdrawing the air or nitrogen laden with water vapor from the evaporating zone and cooling it for condensation of water and separating the water from the gas in a separating zone, c. circulating the air or nitrogen between the evaporating zone and the separating zone, d. admixing the dilute aqueous solution of caffein and the air or nitrogen conveyed from the separating zone to the evaporating zone, e. passing the air or nitrogen laden with water vapor and the admixture formed in step (d) in indirect heat exchange relation between the evaporating zone and the separating zone, for cooling of the air or nitrogen laden with water vapor for the condensation of step (b) and for heating said mixture for heating the aqueous solution for evaporation of step (a), and f. supplying additional heat to the aqueous solution for the evaporation.

5. A process according to claim 4, wherein, in the heat exchange of step (h), the flow is countercurrent.

6. A process according to claim 4, wherein the pressure in the evaporating zone is about 1 to 5 atmospheres.

* * * * *